INVENTOR
Roy A. Plumb
BY Everett G. Wright
ATTORNEY

Patented July 21, 1942

2,290,707

UNITED STATES PATENT OFFICE 2,290,707

COMPOSITION FOR PREVENTING MOISTURE FROM ATTACKING PAINT FILMS ON SURFACES OF POROUS MASONRY FROM THEREBELOW

Roy A. Plumb, Pleasant Ridge, Mich., assignor to Truscon Laboratories, Inc., a corporation of Michigan Application December 11, 1939, Serial No. 308,552

6 Claims. (Cl. 106—245)

This invention relates to an improved composition for preventing moisture from attacking paint films on surfaces of porous masonry from therebelow applicable as a pre-treatment to painting exposed surfaces of porous masonry such as basement walls, artificial and natural stone trim, cement roof tile and the like.

As a general rule there is no major dissatisfaction or complaint with the length of life of standard types and qualities of paint coatings applied to dry, porous masonry surfaces. When used on dry masonry surfaces paint films or coatings show throughout their years of service a slow dusting and breaking down of their binder. Such slow progressive perishment of paint coatings results from general exposure to the elements and is normally expected. However, when moisture is permitted to collect and accumulate at masonry surfaces behind or under paint coatings applied thereover, a general relatively rapid weakening and destruction of the bond between the paint coating and the masonry structure to which it is applied takes place, saponification of saponifiable oils in the paint coating occurs, and a definite crazing, peeling and scaling of the paint coating from the masonry surface results.

Many so-called primers and sealers for porous surfaces have been developed, however, the primers and sealers of the prior art have not been found to be satisfactory inasmuch as they are not repellent to moisture. The primers and sealers are generally nothing more than less viscous formulations of the coating materials to be applied later, the reduction of viscosity being accomplished by the addition of either a volatile product or a vehicle similar to the one used in the later applied finished coat. The primers and sealers merely establish an under film which serves as an anchorage for the later applied finished paint films. Other primers and sealers have been developed which are composed of unsaponifiable materials such as derivatives of rubber, phenol-formaldehyde resins and the like, however, while unsaponifiable, such primers and sealers do not prevent the crazing, cracking and peeling off of paint films applied thereover due to the attack of moisture from therebelow.

The primary object of the invention is to provide a composition and method for dampproofing masonry as a pre-treatment to the application of a paint film over the surface of the masonry which definitely and positively seals and locks the pores of the masonry against moisture to a sufficient depth and with sufficient thoroughness to establish a water-repellent zone at and below the later applied paint film which will prevent moisture from coming into contact with the underside of the paint film applied over the surface of pre-treated masonry.

Another object of the invention is to provide a composition and method for pre-treating masonry prior to applying a paint film thereover which produces at and below the surface treated a condition of effective negative capillarity in the walls of the pores of the masonry whereby to positively repel moisture from attacking the bond between the paint film and the masonry.

Other objects of the invention will become apparent by reference to the following detailed description taken in connection with the accompanying drawing, in which.

Figure 1:
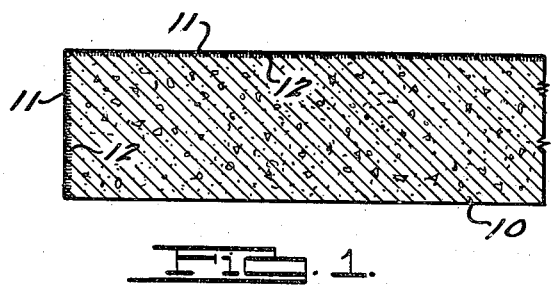
Fig. 1 is a fragmentary sectional view through a piece of porous masonry over which a paint film has been applied.

Heretofore in paint technology it was considered necessary and essential to "fill and seal" the pores of masonry to be painted with a sealer or primer which, however, had no particular effect toward preventing moisture from attacking the bond established between the paint film and the masonry upon the drying and hardening of the paint film. When moisture gradually works its way under the paint film either from above or below the paint film, the bond between the paint film and the masonry becomes weakened and causes, in a comparatively short period of time, a crazing, peeling and scaling of the paint film or coating from the masonry surface. In paint coatings applied over masonry surface, and where a good grade of paint is employed, the great majority of failures of the bond between the paint film and the masonry, even after a so-called primer and sealer has been used, are caused from an attack on the underside of the paint film by moisture from therebelow.

The applicant has discovered that, rather than to attempt to seal the pores of masonry to be painted at the surface thereof or to fill the surface pores with a sealer or primer, the employment of the novel composition and method herein disclosed for pre-treatment of porous masonry to be painted manifests a definite and pronounced water repellency to the walls of the pores of the masonry for a considerable depth below the surface to which the pre-treatment is applied, which pre-treatment establishes a condition of effective negative capillarity in a relatively deep water-repellent zone below the surface of the masonry pre-treated.

When moisture comes into contact with the pre-treated water-repellant zone below the paint film or coating applied to the surface of relatively porous masonry, the passage of the moisture by capillarity from therebelow toward the underside of the paint film is definitely arrested and repelled due to the fact that the moisture cannot possibly wet the pores in the treated zone. As a result, the underside of a paint film or coating applied over the pre-treated masonry surface cannot possibly be attacked by moisture from below, the bond between the paint film and the masonry cannot be weakened or destroyed, and crazing, peeling and scaling of the paint film or coating is prevented.

A composition embodying the invention found extremely satisfactory for the pre-treatment of masonry surfaces prior to applying a paint film or coating thereover comprises:

| | Pounds |
|---|---|
| Paraffin wax having a melting point of 118° to 132° F. | 32 |
| Raw China-wood oil | 350 |
| Petroleum distillate thinner having a boiling range of approximately 270° to 410° F. | 416 |
| Carbon tetrachloride thinner | 214 |

The raw China-wood oil and paraffin wax is heated together until it reaches a temperature of approximately 300° F. and is stirred while maintained at approximately that temperature until the wax becomes dissolved in the oil. The solution of wax and oil is then removed from the source of heat and, with continued stirring, the petroleum distillate thinner is added followed by the carbon tetrachloride thinner. The resultant solution is clear and transparent and is characterized by having a very low viscosity and by having a great ability to penetrate rapidly and deeply into porous masonry.

As the composition penetrates a porous masonry structure, the volatile distillate and carbon tetrachloride evaporate leaving the wax and raw China-wood oil deposited on and immovably anchored to the inner walls of the pores of the porous masonry structure. The raw China-wood oil is employed for its distinct characteristic that the beta-eleostearic glyceride therein crystallizes soon after the evaporation of the distillate and the carbon tetrachloride into a relatively solid material which, upon deposit in the pores of the masonry structure and after drying in the well-known manner common to drying oils generally, is more difficult to wet than dried deposits of other drying oils. Because of imparting non-wetability to the porous masonry to which it is applied, the raw China-wood oil together with the paraffin wax establishes a definite zone of negative capillarity below the surface of the porous masonry structure pre-treated by the novel composition herein disclosed. The heating of the raw China-wood oil to approximately 300° F. during the preparation of compositions embodying the invention in no manner adversely affects the useful characteristic imparted to the composition by the raw China-wood oil crystallizing upon drying, namely, the ability to prevent the wetting of the pores of the masonry pre-treated which establishes a definite zone of negative capillarity below the surface pre-treated prior to painting.

It has been found that the 3½% of wax employed in the foregoing preferred embodiment of the invention may be varied to 3% to 4% without undue precipitation during the pre-treatment of a masonry surface by the composition. The carbon tetrachloride thinner is employed to lower the temperature at which the wax precipitates out of solution whereby to prevent the wax from becoming deposited at or near the surface of the masonry during pre-treatment and thus to assure the establishment of a deep zone of negative capillarity below the surface to be painted. The carbon tetrachloride also raises the flash point of the composition which substantially eliminates the fire hazard at the temperature at which the composition is heated for application to a masonry structure.

The preferred embodiment of the invention heretofore given by example is used as a pre-treatment to masonry having the average porosity. Where the porosity of masonry to be pre-treated is high, the amount of raw China-wood oil may be increased to as high as 300 lbs., and, where the porosity of the masonry to be pre-treated is low, the amount of raw China-wood oil may be reduced to as low as 200 lbs. In each instance the percentage of wax employed in the composition is preferably kept within the range of 3% to 4% and the amount of carbon tetrachloride thinner employed is preferably maintained at approximately 33⅓% by weight of the total thinner used.

The novel composition is applied to the exposed surface of a porous masonry structure such as basement walls, artificial or natural stone trim, cement roof tile or the like as a pre-treatment to the painting of the surface thereof by first thoroughly cleaning the surface to be treated, then heating the composition to approximately 160° to 170° F., then spreading the heated composition over the cleaned surface, and then working the composition well into the masonry structure by an easy scrubbing motion with a suitable brush or broom.

Referring now to the drawing wherein like numerals refer to like and corresponding parts throughout the several views, the porous piece of masonry 10 shown in Fig. 1 has the usual paint film 11 applied over its top and end surface. It will be noted that there is a slight penetration of the paint into the surface pores at 12. Such a paint film is continuously subject to attack from below by moisture, and, in the case of a cementitious masonry structure 10, lime therefrom carried to the underside of the paint film 11 by capillarity will cause saponification of saponifiable oils generally employed in the paint film. All of which causes the paint film to disintegrate, craze, crack, peel and scale, leaving in a relatively short time, an inefficient painted surface which readily admits water from the top or outside of the paint film 10.

Figure 2:
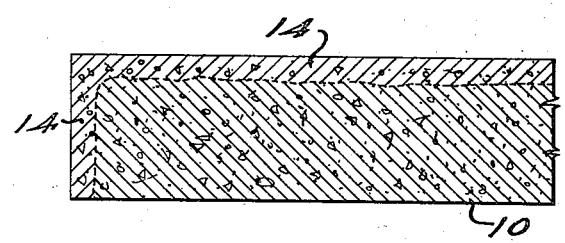
Fig. 2 is a fragmentary sectional view through a piece of porous masonry pre-treated with a single application of a moisture repellent composition embodying the invention.

Fig. 2 shows a porous piece of masonry 10 having its top and end surface treated with a composition embodying the invention. It will be noted that the composition penetrates to a considerable depth and creates a water-repellent zone 14 of complete negative capillarity. The said water-repellent zone 14 is generally from ⅛" to ½" deep, all according to the porosity of the masonry 10.

Figure 3:
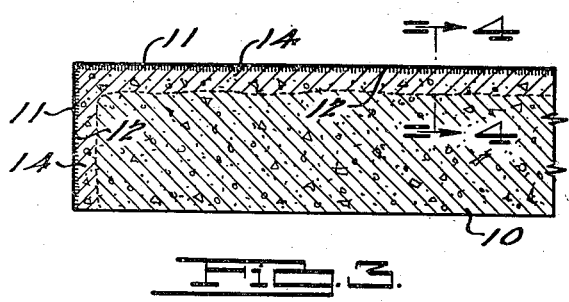
Fig. 3 is a fragmentary sectional view through the porous masonry shown in Fig. 2 after having a paint film or coating applied thereover.

In Fig. 3, a paint film 11 has been applied over the top and end surface of the porous piece of masonry 10 after pre-treatment with a composition embodying the invention to establish the water-repellent zone 14 of complete negative capillarity.

Figure 4:
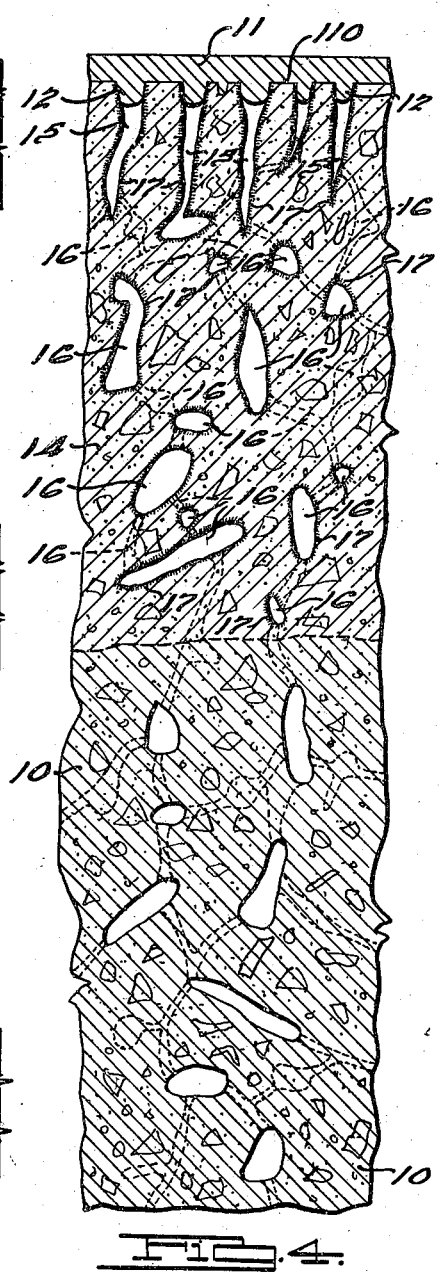
Fig. 4 is a greatly enlarged fragmentary sectional view taken on the line 4—4 of Fig. 3.

Fig. 4 shows a greatly enlarged sectional view through the pre-treated and painted porous piece of masonry 10. It will be noted that the paint film 11 only penetrates and becomes engaged in the surface pores 15 a short distance below the surface 110 of the masonry 10 as indicated by the numeral 12. The small penetration of the paint is due to the fact that paint must have sufficient body to establish a film immediately upon application to a surface and before drying and hardening, which body prevents penetration any appreciable depth into the surface pores of the structure painted.

In contradistinction, it will be particularly noted that the pre-treatment composition herein disclosed penetrates to a relatively great depth to establish the water-repellent zone 14. Both the surface pores 15 and the below-surface pores 16 in the water-repellent zone 14 are coated at 17 by the pre-treatment composition embodying the invention which completely waterproofs them and prevents their wetting. Inasmuch as the interior or below-surface pores 16 in the water-repellent zone 14 cannot be wetted, obviously, the normal capillarity of the porous masonry 10 is destroyed in the water-repellent zone 14 and a condition of complete negative capillarity is obtained.

The applicant herein has attacked the problem of pre-treating a porous masonry surface prior to painting to make it water-repellent not by providing a surface primer, not by providing a surface pore filler, but by establishing a definite zone of negative capillarity in a porous masonry structure below the surface thereof to be painted. Oleo-resinous paint coatings applied to masonry surfaces after pre-treatment in accordance with the invention herein disclosed stay intact much longer than heretofore possible due to the freedom from attack from moisture therebelow.

It is to be understood that the particular composition and method disclosed and the procedure set forth are presented herein for the purpose of illustration and explanation only, and that various equivalents can be used and modifications of the composition, method and procedure set forth can be made without departing from the spirit of the invention as defined in the appended claims.

I claim:
1. A composition for preventing moisture from attacking paint films on surfaces of porous masonry from therebelow applicable as a pre-treatment of the porous masonry prior to applying a paint coating thereover consisting of a solution of raw China-wood oil, a paraffin wax and a thinner wherein the wax content is not less than 3% nor more than 4% by weight of the composition and the China-wood oil is equal to approximately 8 times by weight of the wax.

2. A composition for preventing moisture from attacking paint films on surfaces of porous masonry from therebelow applicable as a pre-treatment of the porous masonry prior to applying a paint coating thereover consisting of a solution of raw China-wood oil, a paraffin wax, and a petroleum distillate and carbon tetrachloride thinner in which the wax content is not less than 3% or more than 4% by weight of the composition and the China-wood oil is equal to approximately 8 times by weight of the wax.

3. A composition for the pre-treatment of porous masonry prior to applying a paint coating thereover consisting of a solution of raw China-wood oil, a paraffin wax, and a petroleum distillate and carbon tetrachloride thinner in which the wax content is not less than 3% or more than 4% by weight of the composition and in which carbon tetrachloride is approximately 33⅓% by weight of the thinner and wherein the China-wood oil is equal to approximately 8 times by weight of the wax.

4. A composition for the pre-treatment of porous masonry prior to applying a paint coating thereover consisting of a solution of from 3% to 4% by weight of paraffin wax, 200 to 300 lbs. of raw China-wood oil and 630 lbs. of a petroleum distillate and carbon tetrachloride thinner.

5. A composition for the pre-treatment of porous masonry prior to applying a paint coating thereover consisting of a solution of from 3% to 4% by weight of paraffin wax, 200 to 300 lbs. of raw China-wood oil, and 630 lbs. of thinner of which approximately one-third by weight is carbon tetrachloride.

6. A composition for the pre-treatment of porous masonry prior to applying a paint coating thereover consisting of a solution of approximately 32 lbs. of paraffin wax having a melting point of 118° to 132° F., approximately 250 lbs. of raw China-wood oil, approximately 416 lbs. of petroleum distillate having a boiling range of 270° to 410° F., and approximately 214 lbs. of carbon tetrachloride.

ROY A. PLUMB.